(12) United States Patent
Sucech et al.

(10) Patent No.: US 7,364,676 B2
(45) Date of Patent: Apr. 29, 2008

(54) SLURRY SPREADER FOR CEMENTITIOUS BOARD PRODUCTION

(75) Inventors: Steven W. Sucech, Lake Villa, IL (US);
Mark H. Englert, Libertyville, IL (US); William A. Frank, Lake Villa, IL (US); Raymond John Mlinac, Wildwood, IL (US); Srinivas Veeramasuneni, Round Lake, IL (US)

(73) Assignee: United States Gypsum Company, Chicago, IL (US)

( * ) Notice: Subject to any disclaimer, the term of this patent is extended or adjusted under 35 U.S.C. 154(b) by 238 days.

(21) Appl. No.: 11/217,720

(22) Filed: Sep. 1, 2005

(65) Prior Publication Data

US 2007/0045892 A1 Mar. 1, 2007

(51) Int. Cl.
*B28B 1/16* (2006.01)
*B28B 13/02* (2006.01)

(52) U.S. Cl. .................. 264/42; 264/169; 264/171.13; 264/212; 425/102; 425/115; 425/224; 425/364 R

(58) Field of Classification Search .................. 264/42, 264/45.8, 70, 169, 171.13, 212, 172.19; 156/39, 156/43, 346; 425/102, 115, 122, 123, 220, 425/224, 364 R
See application file for complete search history.

(56) References Cited

U.S. PATENT DOCUMENTS

| | | | |
|---|---|---|---|
| 1,578,250 A | 3/1926 | Armstrong | |
| 2,213,442 A | 9/1940 | Elliott | |
| 3,532,576 A * | 10/1970 | Proctor et al. | ................ 156/39 |
| 3,578,517 A | 5/1971 | Lapp et al. | |
| 4,105,383 A | 8/1978 | Hanson | |
| 4,203,788 A | 5/1980 | Clear | |
| 4,298,413 A | 11/1981 | Teare | |
| 4,327,146 A | 4/1982 | White | |
| 4,345,887 A * | 8/1982 | Lanneau et al. | ............. 425/115 |
| 4,364,790 A * | 12/1982 | Delcoigne et al. | .......... 156/346 |
| 4,420,299 A | 12/1983 | De Mets | |
| 4,450,022 A | 5/1984 | Galer | |

(Continued)

FOREIGN PATENT DOCUMENTS

WO    WO 02/098646 A1    12/2002

*Primary Examiner*—James Mackey
(74) *Attorney, Agent, or Firm*—Leydig, Voit & Mayer, Ltd.; David F. Janci; Pradip K. Sahu

(57) ABSTRACT

The invention provides a board forming system comprising a forming table comprising a belt with a surface for conveying a backing layer; a mixer fitted with a mechanism capable of depositing cementitious slurry material over a top surface of the backing layer; and a slurry spreader positioned downstream of the mixer, wherein a portion of the slurry spreader comprises a plurality of apertures which are connected to a source of pressurized fluid. The slurry spreader is configured such that the pressurized fluid flows out of the slurry spreader through the apertures so as to provide a continuous film of fluid across an outer surface of the slurry spreader. The slurry spreader is positioned such that it can contact at least a portion of the cementitious slurry after the slurry exits the discharge and before the slurry is spread across the width of the backing layer such that the thickness of the slurry is approximately equal to the desired slurry thickness for board formation. The invention further provides methods for forming cementitious board comprising the use of the slurry spreader.

60 Claims, 3 Drawing Sheets

U.S. PATENT DOCUMENTS

| | | |
|---|---|---|
| 4,477,300 A | 10/1984 | Pilgrim |
| 4,488,917 A | 12/1984 | Porter et al. |
| 4,504,335 A | 3/1985 | Galer |
| RE32,037 E | 11/1985 | Clear |
| 4,793,892 A | 12/1988 | Miller et al. |
| 4,816,091 A | 3/1989 | Miller |
| 4,847,022 A | 7/1989 | Bold |
| 5,221,386 A | 6/1993 | Ensminger et al. |
| 5,342,566 A | 8/1994 | Schafer |
| 5,350,554 A | 9/1994 | Miller |
| 5,643,510 A | 7/1997 | Sucech |
| 5,714,001 A | 2/1998 | Savoly et al. |
| 5,718,797 A | 2/1998 | Phillips et al. |
| 5,854,426 A | 12/1998 | Benda |
| 6,187,409 B1 | 2/2001 | Mathieu |
| 6,190,476 B1 | 2/2001 | Seecharan et al. |
| 6,342,284 B1 | 1/2002 | Yu et al. |
| 6,409,825 B1 | 6/2002 | Yu et al. |
| 6,443,258 B1 | 9/2002 | Putt et al. |
| 6,488,792 B2 | 12/2002 | Mathieu |
| 6,524,679 B2 | 2/2003 | Hauber et al. |
| 6,547,901 B1 | 4/2003 | Gerlich |
| 6,774,146 B2 | 8/2004 | Savoly et al. |
| 6,866,492 B2 | 3/2005 | Hauber et al. |
| 6,874,930 B2 | 4/2005 | Wittbold et al. |
| 6,878,321 B2 | 4/2005 | Hauber et al. |
| 2001/0000738 A1 | 5/2001 | Mathieu |
| 2004/0084127 A1 | 5/2004 | Porter |
| 2004/0231916 A1 | 11/2004 | Englert et al. |

* cited by examiner

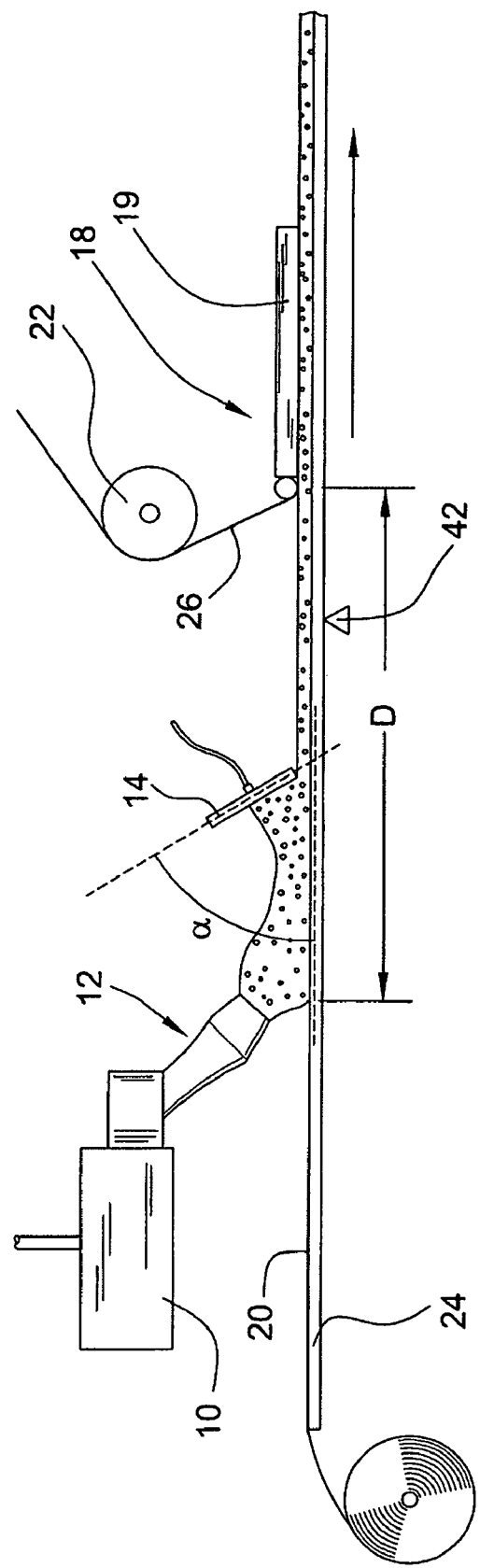
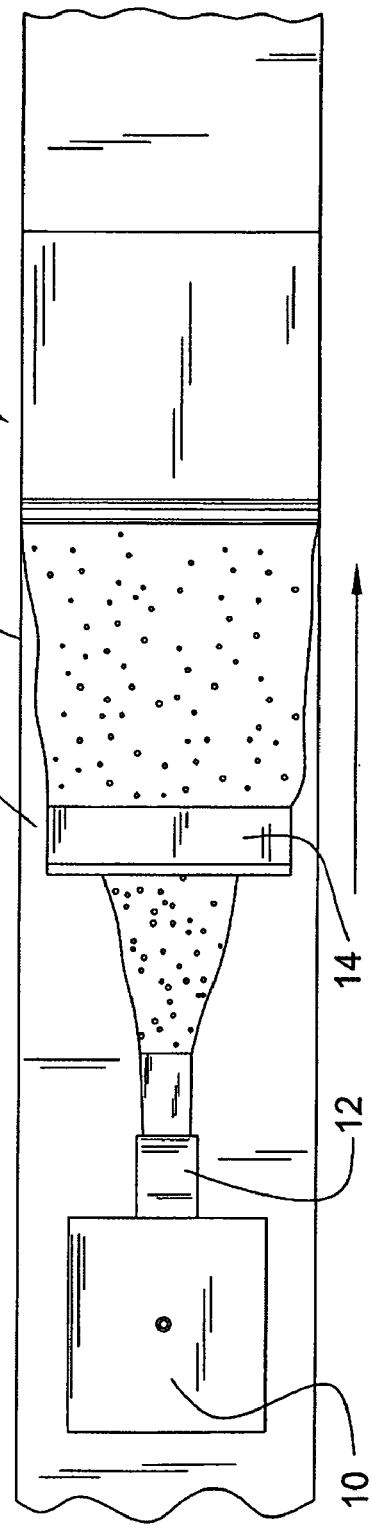

SLURRY SPREADER FOR CEMENTITIOUS BOARD PRODUCTION

BACKGROUND OF THE INVENTION

The present invention relates generally to a cementitious board system and to methods for producing cementitious board.

The use of cementitious materials, such as, but not limited to, calcium sulfate material and Portland cement, is well known in the art for inclusion in various products such as wallboard, acoustical panels, and cement board. A substantially uniform thickness across the length and width of such cementitious boards or panels is desirable for their use in side-by-side arrays on walls, ceilings, or floors. Control of the thickness by means of screeding devices is limited by the flow properties of the hydraulic cement mixture. Cementitious slurries are usually thixotropic but often do not yield quickly enough to a screed laid across a fast moving conveyor belt to be spread evenly. Irregularity in the amount of slurries deposited on a fast moving conveyor belt tends to cause unevenness in the so-called "cement boards" and other building panels manufactured on high-speed production lines.

Cementitious building panels are made commonly in widths of from 24 to 54 inches. The wider the panel, the more difficult is the problem of even distribution of the slurry. The discharge of cementitious slurry onto a moving support surface directly from a continuous mixer could present a continuous ridge of rather immobile material to a downstream screed or forming plate. To aid spreading of the slurry, the amount of water used in the slurry is often increased. However, the presence of large amounts of water is undesirable inasmuch as it must be removed before the final board product is obtained. Water removal is costly because of the energy required to evaporate the water and/or the time required to evaporate the water.

In addition, depending on the speed of the slurry being discharged, the cementitious slurry exiting the mixer can be turbulent such that undesirably large voids (e.g., voids having a diameter of 5 mm or greater) are formed as the slurry contacts the moving support surface. The presence of such large voids is undesirable during board production because it compromises the quality of the resulting board, including, for example, the strength of the board and the score and snap properties, and can lead to formation of blisters.

In the case of cement board, rollers and other devices have been used to spread out the slurry; however, such rollers and devices can suffer from slurry build up which requires them to be continuously cleaned during board production. Continuous cleaning creates a risk that a piece of built up set cement will fall off the rollers and other spreading devices and break the backing paper, or, in some applications, the release paper, thereby requiring complete shut down of the line. Interruption of a board production line is costly and inefficient.

Accordingly, it will be appreciated from the foregoing that there is a need in the art for a cementitious board system and production method that can reduce the amount of water, the number of undesirably large voids, and/or provide a more efficient, low cost board product. The invention provides a board system and methods that include one or more of such features. These and other advantages of the present invention, as well as additional inventive features, will be apparent from the description of the invention provided herein.

BRIEF SUMMARY OF THE INVENTION

The invention is based on the surprising discovery that using a slurry spreader of the present invention to spread cementitious slurry indirectly or directly on the moving backing layer on a board line leads to improvements in the production of cementitious board products. Depending on the parameters used in board production, some or all of the improvements associated with the present invention can be realized. The improvements include a reduction in the amount of water used in the cementitious slurry, the reduction or elimination of the presence of undesirable large voids in the cementitious slurry, and the like.

Accordingly, the invention provides a slurry spreader for contacting the cementitious slurry after the slurry exits the mixer of a board line. At least a portion of the slurry spreader, which is designed to be in surface contact with the cementitious slurry material, comprises a plurality of apertures which are in fluid communication with a fluid source during operation. The slurry spreader is configured such that the fluid, which is normally pressurized, flows out of the slurry spreader through the apertures so as to provide a continuous flow of fluid, preferably as a continuous film, across an outer surface of the slurry spreader. The slurry spreader is positioned such that it contacts at least a portion of the cementitious slurry after the slurry exits the mixer and before the slurry passes through a forming station which performs the final mechanical spreading and/or shaping of the slurry to its predetermined width and thickness to form the wet board precursor to the cementitious board product. In a board forming system comprising a continuously moving backing layer for directly or indirectly receiving the slurry discharged from a mixer, a mixer for making the cementitious slurry, and a forming station, the slurry spreader is positioned downstream of the area at which the slurry discharged from the mixer is deposited on the backing layer and upstream of the forming station, and is in contact with the slurry. It will be appreciated by those skilled in the art that the slurry can be deposited directly onto the backing layer or it can be deposited indirectly onto the backing layer, such as, for example, onto a densified layer carried by the backing layer. Fluid flows from the apertures of the slurry spreader fluid outlet.

The invention also provides a method of forming cementitious board. In one embodiment of the method, a mixture comprising water and a cementitious material is transferred directly or indirectly onto a moving backing layer and contacted with a slurry spreader as described above so as to spread out the slurry over the surface of the backing layer. The cementitious slurry is then optionally contacted with a forming plate so as to form a wet board precursor, which is dried, and cut to form a cementitious board product.

The invention also provides a method of reducing the water to cementitious material ratio during board production. The method comprises forming a mixture comprising water, a cementitious material, and optionally a foaming agent; transferring the mixture directly or indirectly onto a moving backing layer; and contacting at least a portion of the mixture with a slurry spreader of the invention. Contacting the mixture with the slurry spreader facilitates the use of less water in the mixture than would be required in the absence of the slurry spreader.

The invention also provides a method of reducing the number of undesirable large voids during cementitious board production. The method comprises forming a mixture comprising water, optionally a foaming agent, other suitable additives and the like, and a cementitious material; transferring the mixture directly or indirectly onto a moving backing layer; and contacting at least a portion of the mixture with a slurry spreader of the invention so as to spread out the slurry over the surface of the backing layer and eliminate undesirable large voids present in the mixture.

The invention may best be understood with reference to the following detailed description of the preferred embodiments in conjunction with the schematic drawings.

BRIEF DESCRIPTION OF THE SEVERAL VIEWS OF THE DRAWINGS

FIG. 1 illustrates a side view of a board forming system in accordance with a preferred embodiment of the invention.

FIG. 2 illustrates a top view of a board forming system in accordance with a preferred embodiment of the invention.

DETAILED DESCRIPTION OF THE INVENTION

Figure 3A:
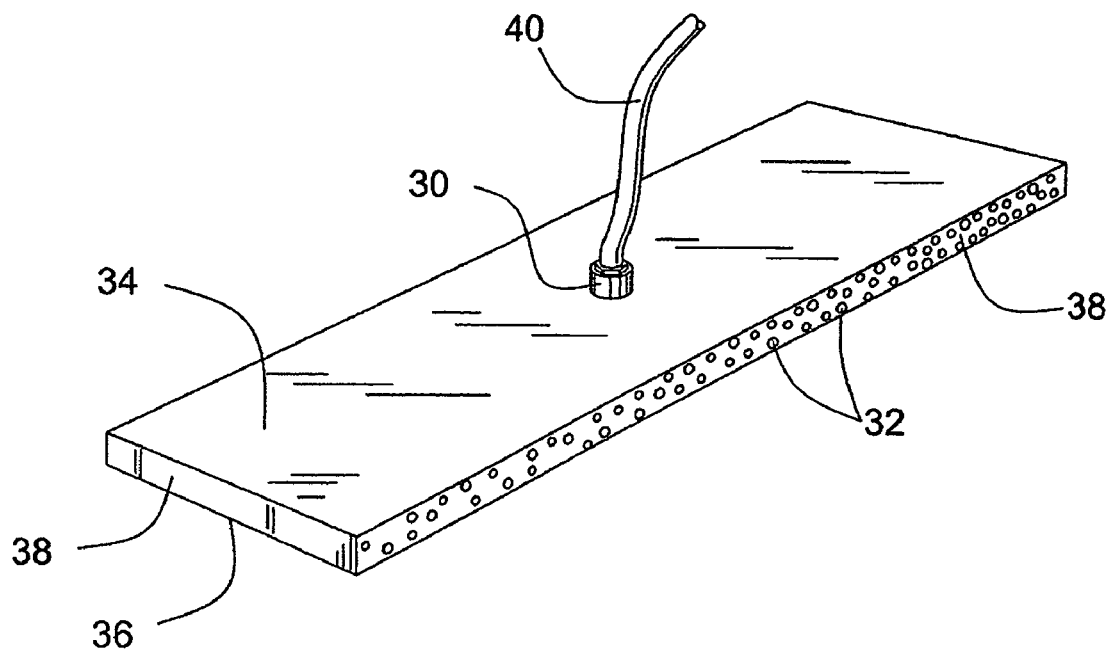
FIG. 3a illustrates a top view of a slurry spreader to be used in a board forming system in accordance with a preferred embodiment of the invention.
Figure 3B:
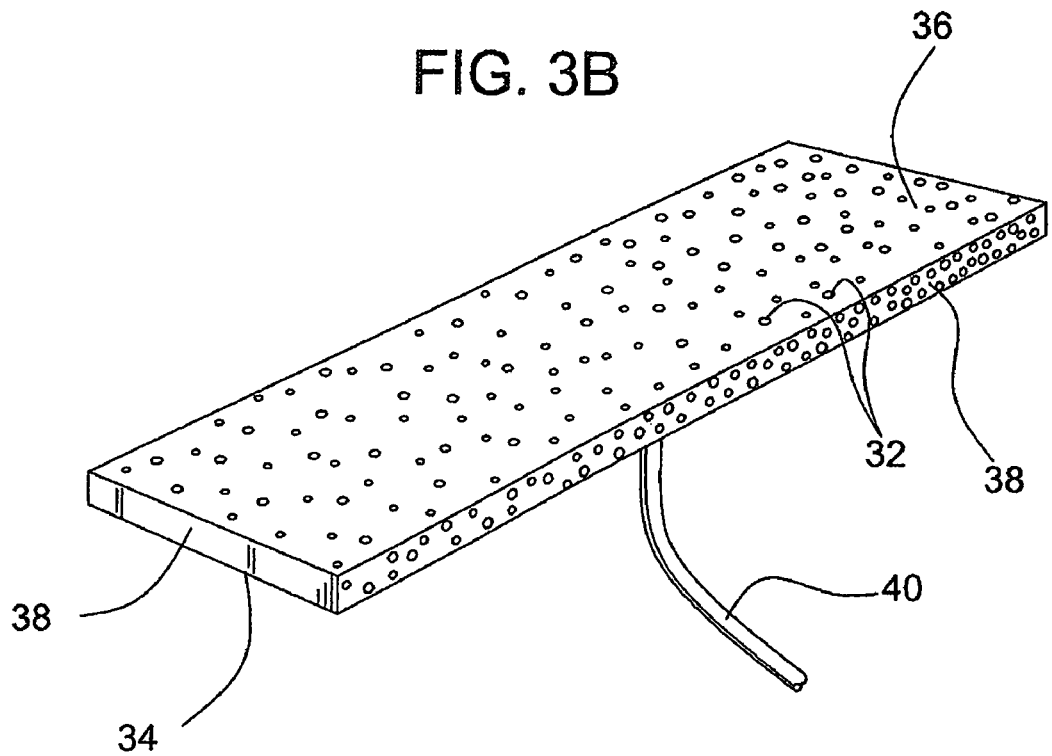
FIG. 3b illustrates a bottom view of a slurry spreader to be used in a board forming system in accordance with a preferred embodiment of the invention.
Figure 4A:
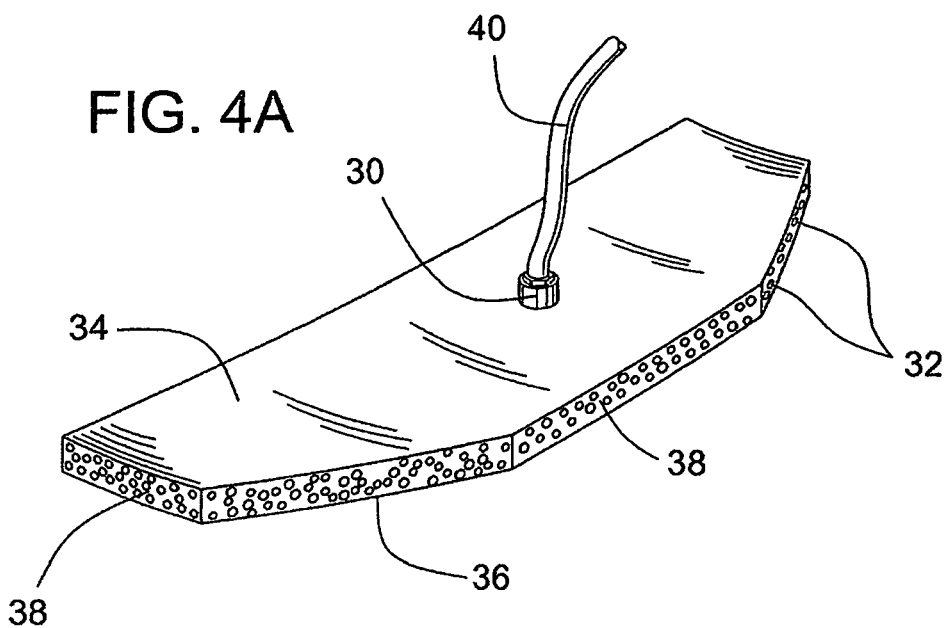
FIG. 4a illustrates a top view of a slurry spreader to be used in a board forming system in accordance with a preferred embodiment of the invention.
Figure 4B:
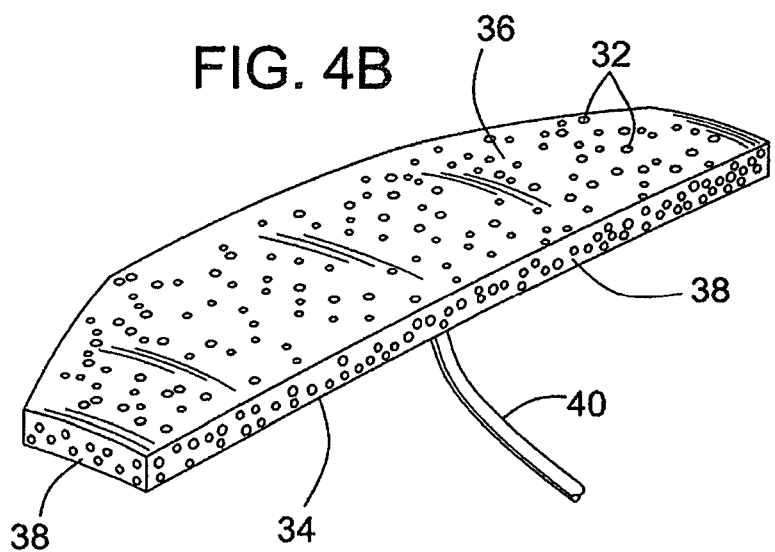
FIG. 4b illustrates a bottom view of a slurry spreader to be used in a board forming system in accordance with a preferred embodiment of the invention.
Figure 5:
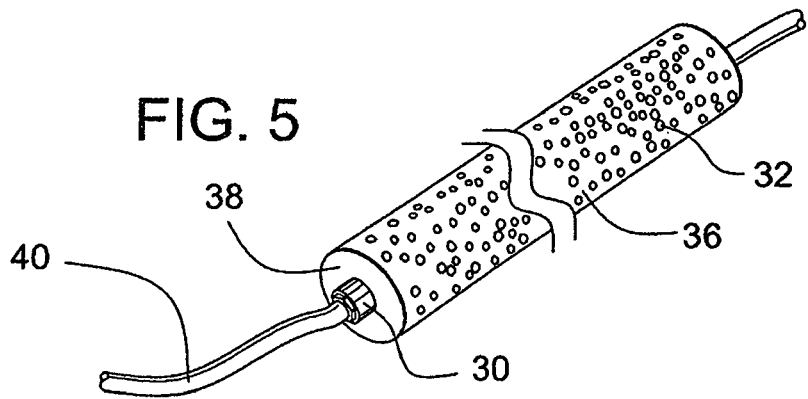
FIG. 5 illustrates a slurry spreader to be used in a board forming system in accordance with a preferred embodiment of the invention.

Turning to FIGS. 1 and 2, a board forming system 1 includes a mixer 10 with a discharge outlet 12, a slurry spreader 14, a forming station 18, a backing layer 20, an optional cover layer roll 22, and preferably a forming table with a conveyor 24 to facilitate the continuous production of cementitious board product. In operation, cementitious slurry used for forming the core of the board is prepared in mixer 10 and discharged through discharge outlet 12 directly or indirectly onto backing layer 20. The discharge outlet (or depositing mechanism) can be any suitable discharge outlet. For example, suitable slurry discharge outlets are described in U.S. Pat. No. 6,874,930, which is incorporated by reference herein. The slurry from the mixer can be deposited directly onto the backing paper, although in some embodiments, the slurry from the mixer is deposited indirectly onto the backing layer, such as for example, onto a densified layer. In a preferred embodiment of the invention, such as for gypsum wallboard or acoustical panel production, including but not limited to ceiling tile, wall panel, and partitions for office cubicles, the slurry for forming the core of the board is deposited onto a densified layer (i.e., a skim coat layer) of cementitious slurry carried by the backing layer, as described, for example, in U.S. Pat. Nos. 4,327,146 and 5,718,797, each of which is incorporated by reference herein. As is known in the art, the densified layer can be achieved by directing a portion of the slurry out of the mixer prior to introduction of foam or by beating foam out of the slurry. As is also known in the art, a second densified layer can optionally be applied on top of the core slurry, particularly in embodiments where a cover layer is employed such as with gypsum drywall. The densified layer(s) can have any suitable thickness, such as, for example, from about 0.0625" to about 0.125".

Backing layer 20 is discharged onto conveyor 24 and is carried by the conveyor, preferably continuously, to facilitate the continuous formation of cementitious board. In conventional manufacture of cementitious board, the backing layer typically is paper, for example manila paper or kraft paper, non-woven glass scrims, woven glass mats, other synthetic fiber mats such as polyester, metallic foil such as aluminum, and the like, and combinations thereof. In some embodiments, such as in Portland cement board production, backing layer 20 is a release layer that is removable from the board product. The backing layer with slurry deposited thereon passes the slurry spreader after which the slurry is optionally covered with a cover layer 26 discharged from cover layer roll 22. The wet board then passes through forming station 18. Slurry spreader 14 is positioned such that at least a portion of the cementitious slurry contacts the slurry spreader after the slurry exits discharge outlet 12 and before the slurry passes through forming station 18, as backing layer 20 travels in the direction of the forming station.

The forming station is the location in the board line where wet board precursor is sized to a pre-determined width and thickness, and optionally, length. Thus, the forming station includes, or can be, any device capable of performing a final mechanical spreading and/or shaping of the slurry across the width of the backing layer, many of which are known in the art. The forming station comprises a means of conforming the slurry thickness and width to the final desired thickness and width of a wet board precursor that, when set, will produce the cementitious board product. The final desired slurry thickness and width produced at the forming station can, of course, differ from the final thickness and width of the finished board product. For example, the slurry thickness and/or width can expand and/or contract during crystallization (i.e., setting) and drying of the slurry. Typically, the desired slurry thickness is substantially equal to the desired board thickness (e.g., about 0.375", about 0.5", about 0.625", about 0.75", about 1", or thicker). By way of illustration only, the final board thickness typically is within about ±⅛" or less of the final slurry thickness.

The forming station includes any device that is capable of creating the desired slurry thickness and width of the wet board precursor. Suitable devices include, for example, a forming plate, a forming roller, a forming press, a screed, and the like. The particular device used will depend, in part, on the type of cementitious board being produced. In a preferred embodiment, for example when the board forming system is a gypsum board or acoustical panel forming system, the board forming station comprises a forming plate 19 as is known in the art (see FIG. 1). In other embodiments, for example when the board forming system is a Portland cement board forming system, the forming station is a forming roller or screed. The board forming system of any of the above embodiments optionally further comprises a vibrator capable of vibrating the slurry disposed on the backing layer, a blade for cutting wet board precursor or dry cementitious board product to the desired lengths, and/or a drying region capable of removing water from the set cementitious board.

In some embodiments, for example when the board forming system is a gypsum cement board forming system, it is desirable that slurry spreader 14 be positioned between the slurry discharge 12 and the forming plate 19 in an area where the flow rate of the slurry on the moving backing layer flowing from the slurry discharge has slowed such that the slurry flow rate is substantially equal to the rate of travel of the moving backing layer. It is believed that such placement of the slurry spreader is desirable because the turbulence of the slurry moving with the backing layer is sufficiently lessened to allow effective contact with the slurry spreader. Thus, the actual placement of the slurry spreader will depend, at least in part, on the flow rate of the slurry exiting the slurry discharge. Typically, this means that the slurry spreader will be positioned closer to the forming plate 18 than the mixer 10 in a board forming system. Turning to FIG. 1, in this illustrated embodiment for a distance D between the area where the slurry exiting the slurry discharge 12 of the mixer contacts (directly or indirectly) the backing layer and the front of the forming station 18, slurry spreader 14 preferably is positioned from about 0.5 D to about 0.9 D away from the area where the slurry first contacts the backing layer, or the densified layer carried on the backing layer.

Slurry spreader 14 comprises a fluid inlet 30 and a fluid outlet 32 in communication with the fluid inlet for discharging fluid from the slurry spreader. At least a portion of the slurry spreader comprises a plurality of apertures, which are connected to a source of pressurized fluid through a fluid inlet. Preferably, the apertures are microporous. The portion of the slurry spreader with the plurality of apertures may be referred to as a fluidization membrane. The slurry spreader is configured such that fluid flows out of the slurry spreader through the apertures so as to provide a continuous source of fluid across an outer surface of the slurry spreader, which contacts the cementitious slurry. The portion of the slurry spreader that comprises the plurality of apertures can be configured any suitable way. Desirably, the portion comprising the apertures is configured such that it "weeps" fluid at a flow rate and/or a pressure drop sufficient to substantially prevent the cementitious slurry from adhering to the surface of the slurry spreader upon contact. In addition, it is desirable to limit the amount of fluid that flows out of the slurry spreader so as to avoid any adverse affect on the cementitious slurry or the board forming process.

Preferably, slurry spreader 14 is fed with pressurized fluid such that the pressure drop across the portion of the slurry spreader comprising the apertures not only provides a continuous flow of liquid to the apertures but it also limits the flow rate at which fluid weeps from the apertures. The pressure drop desired for use in slurry spreader 14 will depend on the water-to-cementitious material ratio of the slurry, additives included in the slurry, the rate of discharge of the slurry from the mixer, the rate at which the slurry and backing paper travel from the slurry discharge of the mixer to the forming station and the like. Adjustments in the various parameters selected for board manufacture will directly and indirectly affect the desired flow rate of fluid from the apertures of the slurry spreader and the amount of fluid discharged from the apertures. Typically, a pressure drop of at least about 0.1 psig (pounds-force per square inch gauge) across the aperture portion of the slurry spreader is useful. Pressure drops of at least 0.25 psig, or at least about 1 psig are also useful. Preferably, the pressure drop is from about 0.2 psig to about 20 psig. More preferably, the pressure drop is from about 0.3 psig to about 20 psig. The fluid flow rate from the slurry spreader is preferably low so as to limit the amount of fluid added to the cementitious slurry. Limiting the fluid added to the slurry will also reduce the energy requirements and/or time to dry the board during and after it is set. Typically, the flow rate of the fluid through the apertures of the slurry spreader is about 0.6 gallons per minute (gpm) per square foot of wet cementitious board precursor or less. Preferably, the flow rate is about 0.5 gpm per square foot or less. More preferably, the flow rate is about 0.4 gpm per square foot or less.

The portion of the slurry spreader comprising the apertures can comprise any suitable material. The material desirably is substantially resistant to corrosion. The material can comprise a metal, a polymer, a ceramic, or combinations thereof. Suitable metals include stainless steel (316L, 304L, 310, 347, and 430), titanium, and metal alloys including Hastelloy (C-276, C-22, X, N, B, and B2), Inconel (600, 625, and 690), Nickel 200, Monel® 400 (70 Ni-30 Cu), and Alloy 20. In a preferred embodiment the material is stainless steel. Suitable polymers include polypropylene, nylon, polycarbonate, polyester, polysulfone, polyethersulfone, and fluoropolymers such as polyvinylidene fluoride and polytetrafluoroethylene (PTFE). Suitable ceramics include silica, alumina, zirconia, titania, glass, silicon carbide, and the like. The material can also be a ceramic-supported polymer membrane, for example a zirconia PVP membrane.

The portion of the slurry spreader comprising the apertures can be formed by any suitable method. For example, the portion can consist of a sheet with a plurality of microporous apertures cut or cast therein. By way of example, the aperture portion can comprise a stainless steel membrane comprising about 1,500 holes per square inch or more. In some embodiments the aperture portion can comprise a stainless steel membrane comprising about 10,000 holes per square inch or more. Alternatively, the portion of the slurry spreader comprising the apertures can comprise 2 or more compressed screens with, for example, 1,500 to 160,000 holes per square inch or greater, or, in some embodiments, 10,000 to 160,000 holes per square inch or greater. In addition, the portion of the slurry spreader comprising the apertures can comprise a porous metal material consisting of a compressed sintered metal powder. By way of example, the portion can comprise a Dynapore® FoilMesh™ LFM-1, LFM-5, or LFM-10 membrane, commercially available from Martin Kurz & Co., Inc. of Mineola, NY, or a 0.2 μm or 0.5 μm porous 316SS membrane, commercially available from Mott Corporation of Farmington, CT.

As one of ordinary skill in the art will appreciate, a desired mesh size can be achieved by a variety of methods so long as the apertures through which the fluid passes allow the fluid exiting the spreader to contact the slurry passing the slurry spreader and inhibit the slurry from attaching to the slurry spreader in a way that obstructs the passage of fluid through the apertures. For example, a membrane can be formed so as to have the desired number and size of apertures. Further, by way of illustration, and not in limitation of the invention, a membrane with the desired mesh size can be achieved by forming a multi-layered structure of two or more screens, each of which has a pre-selected number and size of apertures therein, and combining the screens as, for example, by compressing and sintering the screens to produce the desired membrane having the desired number and size of apertures per square inch. While various combinations of screens can be used in any order suitable to form the membrane of desired number and size of apertures per inch, in one embodiment, a multi-layer membrane comprises a base screen having the largest sized apertures, and successive screens having progressively smaller sized apertures but a larger number of apertures per inch leading to the top screen, wherein the top screen has the greatest number of apertures and the smallest sized apertures per square inch. It will also be appreciated by those skilled in the art that the membrane selected or made for the slurry spreader is preferably balanced with the desired fluid flow rate from the spreader and the pressure head of the fluid in the spreader.

The slurry spreader further comprises a chamber, which can act as a plenum and contain the pressurized fluid, a fluid inlet in fluid contact with the chamber, and a fluid inlet for receiving fluid from a fluid source. The fluid inlet can comprise a hose, tube, or the like. The chamber can have any suitable dimensions. Desirably, the chamber is configured such that a constant flow rate and/or pressure drop exists across the entire portion of the slurry spreader comprising a plurality of apertures. Typically, the length of the chamber will be substantially equal to the length of the slurry spreader. In some embodiments, it is desirable that the volume of the chamber is constant across the length and width of the chamber. The inlet can be placed at any suitable position on the slurry spreader. Typically, the inlet is positioned opposite the surface of the slurry spreader, which contacts the slurry.

The slurry spreader can have various configurations and can be oriented in various directions relative to the board forming system. It is desirable that at least a portion of the slurry spreader comprising a plurality of apertures contacts the slurry before it reaches the forming station thereby generating a slurry "dam." In addition, it is desirable that the slurry spreader causes the slurry to spread out across the width of the backing layer. Accordingly, the slurry spreader desirably has dimensions and an orientation with respect to the board forming system suitable for contacting the slurry in this manner. In embodiments in which the board system comprises more than one slurry spreader, only one of the slurry spreaders desirably is configured to contact the slurry in this manner, although the invention is not limited to one such slurry spreader.

Typically, the slurry spreader is oriented such that its longest dimension is transverse to the direction of the backing layer and slurry as they travel from the mixer discharge to the forming station. For example, as shown in FIG. 2, the slurry spreader 14 can straddle the conveyor 24 and backing layer 20 of the board line across the width of the line. It will be appreciated that the slurry spreader is oriented relative to the slurry so that the aperture portion of the slurry spreader is in contact with the slurry such that fluid flow from the apertures of the slurry spreader contacts the slurry as it passes the spreader. The slurry spreader can be oriented so the aperture portion is perpendicular to the direction of the conveyor; for example, the slurry spreader can also be oriented at an angle with respect to the direction of the conveyor. The height of the slurry spreader is not critical. Typically, it is desirable that the height of the slurry spreader be such that the lowest edge of the spreader is higher than the desired thickness of the cementitious board product. Preferably, the slurry spreader is positioned such that its lowest edge is about 0.2" or more, more preferably about 0.25" or more, above the desired thickness of the cementitious board product.

The length of the slurry spreader is not critical. Typically, it is desirable that the length of the slurry spreader is less than the width of the board production line such that the slurry spreader does not traverse the entire width of the backing layer. Preferably, the length of the slurry spreader is at least about one quarter the width of the board production line. More preferably, the length of the slurry spreader is from about 10 inches to about 50 inches (e.g., about 15 inches to about 45 inches).

The slurry spreader can have any suitable cross-sectional shape. For example, the slurry spreader can have a rectangular, triangular, circular, semi-circular, trapezoidal, ovular, arched or similar cross-sectional shape. Moreover, the surface of the slurry spreader in contact with the slurry can have any suitable contour. For example, the surface can be substantially flat or curved (concave or convex). In a preferred embodiment, the cross-sectional shape of the slurry spreader is arched such that it has a curved, convex surface in contact with the slurry. In some embodiments, it may be desirable that the surface further comprises a surface texture, for example grooves which direct the cementitious slurry to the edges of the slurry spreader. The slurry spreader optionally further comprises a raised edge (raised in the upstream direction) which can contact the slurry being deposited by the mixer and reduce the likelihood that such slurry will spill over the top of the slurry spreader. The raised edge optionally comprises a plurality of apertures.

In one preferred embodiment, the slurry spreader is in the shape of a rectangular box. For example, the slurry spreader can be in the shape of a rectangular box, wherein three sides of the box including the surface of the box, which contacts the slurry comprise a plurality of apertures. As shown in FIGS. 3*a* and 3*b*, a particularly preferred slurry spreader in accordance with the invention comprises a chamber having a back wall 34, a front wall 36, which contacts slurry, and four side walls 38, a fluid inlet 30, and a hose 40 for providing fluid from a fluid source. At least a portion of the front, back, and/or side walls comprises a plurality of apertures 32. Preferably, the apertures in the slurry spreader are microporous.

In another preferred embodiment, the slurry spreader has an arched cross-sectional shape. As shown in FIGS. 4*a* and 4*b*, the slurry spreader comprises a chamber having an arched cross-section comprising a back wall 34, front walls 36 which contact slurry, side walls 38, a fluid inlet 30, and a hose 40. The front wall comprises a plurality of apertures 32. Preferably the apertures are microporous. A slurry spreader having an arched cross-sectional shape is believed to be advantageous because it allows for a more even pressure drop across the apertured portion of the slurry spreader.

In yet another preferred embodiment, the slurry spreader is in the shape of a curved plate or tube. As shown in FIG. 5, the slurry spreader is a roller comprising a chamber having a surface 36 comprising a plurality of apertures 32, preferably microporous apertures. The slurry spreader comprises a fluid inlet 30, and a hose 40 providing fluid from a fluid source.

In some embodiments, the slurry spreader desirably is oriented such that at least one surface of the slurry spreader, which comprises a plurality of apertures, is angled such that it is not parallel to the plane of the backing layer, and contacts the slurry so as to form a slurry dam. When the slurry spreader has a flat contour which contacts the slurry so as to form a slurry dam (e.g., a rectangular or trapezoidal slurry spreader), it is possible to define an angle ($\alpha$) between the plane of the backing layer and the plane defined by the length and width of the slurry contact surface of the slurry spreader (see FIG. 1). Preferably, the angle $\alpha$ between the surface of the slurry spreader, which contacts the slurry and the backing layer, is between about 10° and about 90° (e.g., between about 10° and about 60°). It also will be appreciated that in other preferred embodiments the slurry spreader has a curved contour, which contacts the slurry, preferably, so as to form a slurry dam.

One of ordinary skill in the art will appreciate that the surface of the slurry spreader, which defines the angle $\alpha$ and contacts the slurry is not required to be the surface of the slurry spreader with the greatest surface area. For example, the slurry spreader may have a first raised portion having a plurality of apertures which forms an angle α between the surface of the slurry spreader which contacts the slurry and the backing layer and a second, larger portion which is parallel to the plane of the backing layer but which also comprises a plurality of apertures and contacts the slurry. Furthermore, the slurry spreader may in some cases be used in place of, or in conjunction with, a forming plate. When the slurry spreader is used in place of a forming plate, the surface of the slurry spreader having a plurality of apertures that contacts the slurry will be parallel to the plane of the backing layer. When the slurry spreader is used in conjunction with a forming plate, the surface of the slurry spreader having the plurality of apertures that contacts the slurry can be parallel to the plane of the backing layer.

The pressurized fluid can be any suitable fluid. Typically, the fluid comprises water. Optionally the fluid further comprises additives, which preferably are dissolved in the water. Suitable additives include stiffeners such as aluminum sulfate or acids, such as inorganic or organic acids and the like, and retardants such as alcohols and the like. In some embodiments, it may be desirable that the fluid comprise steam vapor. Preferably, the fluid comprises water. More preferably, the fluid comprises filtered and demineralized water. Any suitable water softener and/or water filter can be used in conjunction with the slurry spreader.

In some embodiments, the cementitious slurry material is deposited onto a backing layer, which has been coated with a densified layer. Accordingly the cementitious slurry is deposited directly onto the densified layer and indirectly onto the backing layer. Preferably, in the cementitious board product, the set cementitious slurry is not in direct contact with the backing layer.

The board forming system optionally further comprises a slurry vibrator. An indirect slurry vibrator can be used in conjunction with a slurry spreader according to the invention to eliminate any large bubbles or voids, or cavities that may result when the large bubbles or voids rupture, which are exposed during the slurry spreading operation. The vibrator can be any suitable vibrator, many of which are known in the art. Typically, the vibrator is disposed within the forming table and is in contact with the bottom side of the backing layer. Suitable vibrators include a segmented roll of various shapes, which acts as a beater bar, a rotating polygonal shaft, for example, as described in U.S. Pat. No. 4,477,300, which is incorporated by reference herein, and the like. In some embodiments, the vibrator 42 desirably is placed beneath forming table 24 and backing layer 20 downstream of the slurry spreader and upstream of the forming station, as is illustrated, for example in FIG. 1. In other embodiments, it is desirable to place the vibrator upstream of the slurry spreader and forming station.

The board forming system of the invention optionally comprises more than one slurry spreader. The additional slurry spreaders can be located in any suitable position and can be placed upstream or downstream of the forming plate, if present, or the area at which the slurry is spread across the width of the backing layer. In some embodiments, it is desirable that the additional slurry spreader(s) be placed near the first slurry spreader and upstream of the forming plate, if present, or upstream of the area at which the slurry is spread across the width of the backing layer. For example two or more slurry spreaders can be placed in succession and can work together to spread out the cementitious slurry evenly across the backing layer. In one preferred embodiment, the presence of multiple slurry spreaders is sufficient to spread out the cementitious slurry and eliminate the need for a forming plate. In another preferred embodiment, a slurry spreader itself functions as the forming plate and can be used in conjunction with or instead of a conventional forming plate. Other combination of slurry spreaders and a forming plate are likewise contemplated. For example, more than one slurry spreader can be used with or without a forming plate, and one or more of the slurry spreaders can be used as described heretofore, and one or more of the slurry spreaders can be parallel to the plane of the backing layer.

The board forming system can be used to form any type of cementitious board. In some embodiments, the board forming system is a gypsum board, such as a gypsum drywall, forming system. In other embodiments, the board forming system is a Portland cement board forming system. In yet other embodiments, the board forming system is an acoustical panel forming system.

In an embodiment, the board forming system is a gypsum board forming system comprising (a) a forming table for conveying a backing layer; (b) a mixer including a slurry discharge for depositing cementitious slurry material onto the backing layer; and (c) a slurry spreader comprising a fluid inlet and a fluid outlet in communication with the fluid inlet for discharging fluid from the slurry spreader. At least a portion of the fluid outlet comprises a plurality of apertures, preferably microporous apertures, which are connected to a source of fluid. Fluid flows out of the slurry spreader through the fluid outlet so as to provide a sufficient amount of fluid to the passing slurry to spread the slurry along the width of the backing layer. In a preferred embodiment, the fluid outlet comprises microporous apertures and the fluid is fed to the slurry spreader under sufficient pressure such that the fluid exiting the spreader through the apertures forms a continuous film on the surface of the spreader fluid outlet. The board forming system optionally includes (d) a slurry vibrator and (e) a forming station depending on the number and function of the slurry spreader. The board forming system further includes (f) a knife or board cutting system and (g) a drying region capable of removing water from the formed board. The slurry spreader is positioned downstream of the region where slurry is discharged from the mixer such that it contacts at least a portion of the cementitious slurry after the slurry exits the discharge and before the slurry passes the forming station, as is described above.

The term "cementitious" as used herein is to be understood as referring to any material, substance, or composition containing or derived from hydraulic cement. For example cementitious can refer to Portland cement, sorrel cement, slag cement, fly ash cement, calcium alumina cement, calcium sulfate α-hemihydrate, calcium sulfate β-hemihydrate, natural, synthetic or chemically modified calcium sulfate α-hemihydrate, calcium sulfate dihydrate (gypsum), and mixtures thereof. The term "calcium sulfate material" is intended to mean calcium sulfate anhydrite, calcium sulfate β-hemihydrate, calcium sulfate dihydrate; ions of calcium and sulfate, or mixtures of any or all thereof. The term "slurry" is to be understood as referring to a flowable mixture comprising water and hydraulic cement. Preferably, the cementitious slurry comprises calcium sulfate material or Portland cement.

The cementitious slurry can be any conventional cementitious slurry, for example any cementitious slurry commonly used to produce gypsum wallboard, acoustical panels including, for example, acoustical panels described in copending U.S. application Ser. No. 10/804,359 published as U.S. Patent Application Publication 2004/0231916 A1, which is incorporated by reference herein, or Portland cement board. As such, the cementitious slurry can optionally further comprise any additives commonly used to produce cementitious board products. Such additives include structural additives including mineral wool, fiberglass, perlite, clay, calcium carbonate, polyester, and paper fiber, as well as chemical additives including foaming agents, sugar, enhancing agents such as phosphates, phosphonates, and the like as described, for example, in U.S. Pat. No. 6,342,284, which is incorporated by reference herein, retarders, binders (e.g., starch and latex), colorants, and the like.

The board forming system of the invention is also useful in a method of forming a cementitious board material. The method comprises (a) forming a mixture comprising water and a cementitious material; (b) transferring the cementitious slurry mixture onto a moving backing layer such as paper, directly or indirectly; and (c) contacting at least a portion of the cementitious slurry with a slurry spreader as described above. Optionally, the method further comprises (d) contacting the cementitious slurry with a forming plate so as to form a wet board precursor and/or (e) cutting and drying the wet board precursor to form a board product. In this context, "drying" refers to removing excess and/or residual moisture after the cementitious board has substantially set. "Curing" refers to the application of heat to a cementitious board precursor to enhance or promote setting of the cementitious material. A densified layer optionally can be deposited onto the backing layer before the cementitious slurry is transferred onto the moving backing layer.

While the board forming system of the invention can be used in a method of producing cementitious board materials using conventional cementitious slurries, a surprising feature of the invention is that the amount of water in the cementitious slurry can be reduced relative to the amount required by conventional board forming systems which do not use a slurry spreader in accordance with the invention. Accordingly, the board forming system of the invention is also useful in a method of reducing the ratio of water to cementitious material in a cementitious slurry during board production comprising (a) forming a mixture comprising water, a foaming agent, and a cementitious material, (b) transferring the mixture onto a moving backing layer, directly or indirectly; and (c) contacting at least a portion of the mixture with a slurry spreader so as to spread the mixture along the width of the backing layer as the slurry passes the slurry spreader. Because the slurry spreader provides a weeping surface that facilitates distribution of the slurry, it is possible to use a lower water-to-cementitious material ratio than in board manufacture heretofore practiced in the art. Thus, contacting the mixture with the slurry spreader enables the use of less water in the mixture of step (a) than would be required in the absence of the slurry spreader. For example, in embodiments of the invention, such as with gypsum wallboard or acoustical panel, the water-to cementitious material ratio can be below about 80:100, more preferably from about 50:100 to about 70:100, still more preferably 60:100 to about 65:100. In some embodiments, such as with some acoustical panels, the ratio may be somewhat higher, such as about 70:100 to about 120:100, or even about 90:100 to about 120:100. In other embodiments of the invention, such as with cement board, the water-to-cementitious material ratio can be from about 25:100 to about 50:100, preferably from about 30:100 to about 45:100, more preferably from about 32:100 to about 42:100, and still more preferably from about 34:100 to about 40:100. The method optionally further comprises (d) contacting the mixture with a forming plate so as to form a wet gypsum board precursor and/or (e) cutting and drying the wet gypsum board precursor to form a gypsum board product. A densified layer optionally can be deposited onto the backing layer before the cementitious slurry is transferred onto the moving backing layer.

The method of the invention enables a reduction in the amount of water used to form the cementitious mixture without adversely impacting the quality of the board product, such as, for example, board strength, appearance, sag resistance, or set time. Desirably, the amount of water used to form the cementitious mixture is reduced by about 5% or more (e.g., about 10% or more, or about 15% or more) as compared to forming the cementitious mixture absent the slurry spreader of the invention. Reductions in the amount of water used to form the cementitious mixture of about 10% or more, or of about 15% or more, or even greater are achievable. In addition, or alternatively, the amount of dispersant (e.g., naphthalene sulfonate) added to the cementitious slurry can also be reduced (e.g., reduced by about 5% or more, or about 10% or more). One of ordinary skill in the art will appreciate that when the amount of water and/or dispersant present in the cementitious slurry is changed (e.g., reduced), the relative amount of other additives added to the slurry may also need to be adjusted. For example, the relative amount of foaming agents such as stable and unstable soaps used in gypsum wallboard production (see U.S. Pat. Nos. 5,643,510, 5,714,001, and 6,774,146) may be adjusted in order to maintain the desired foam bubble void size.

The board forming system of the invention is also useful in a method of reducing the number of undesirable large voids in a cementitious board (in particular a gypsum board). As discussed above, undesirably large voids typically are voids having a diameter of about 5 mm or greater. Such large voids are distinguished from smaller desirable voids which might otherwise be considered large (i.e., voids having a diameter of less than 5 mm) whose presence can increase board strength while decreasing overall board weight (see U.S. Pat. Nos. 5,643,510, 5,714,001, and 6,774,146). Such method comprises (a) forming a mixture comprising water, a foaming agent, and calcium sulfate material; (b) transferring the mixture onto a moving backing layer; and (c) contacting at least a portion of the mixture with a slurry spreader so as to spread the mixture along the width of the backing layer as it travels past the slurry spreader, and reduce the number of and/or eliminate large voids present in the mixture. Desirably, at least some of the large voids are eliminated. Preferably, all of the large voids are eliminated. Optionally the method further comprises (d) contacting the mixture with a forming plate as is known in the art so as to form a wet gypsum board precursor and/or (e) cutting and drying the wet gypsum board precursor to form a gypsum board product. A densified layer optionally can be deposited onto the backing layer before the slurry is transferred onto the moving backing layer.

An additional benefit of the inventive system and methods described herein is that the use of a slurry spreader can improve control of the slurry head that is formed upstream of the forming station. For example, a smoother and less variable slurry head can be achieved which results in improved control of edge formation in the cementitious board product.

All references, including publications, patent applications, and patents, cited herein are hereby incorporated by reference to the same extent as if each reference were individually and specifically indicated to be incorporated by reference and were set forth in its entirety herein.

Preferred embodiments of this invention are described herein. Variations of those preferred embodiments may become apparent to those of ordinary skill in the art upon reading the foregoing description, without departing from the spirit and scope of the invention. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A board forming system comprising:
   (a) a mixer for making a cementitious slurry, the mixer comprising a discharge for the slurry;
   (b) a forming table and optionally a backing layer for receiving slurry discharged from the mixer;
   (c) a slurry spreader downstream of the slurry discharge of the mixer and in contact with the cementitious slurry after the slurry is discharged from the mixer, the slurry spreader comprising a fluid inlet and a fluid outlet in communication with the fluid inlet for discharging fluid from the slurry spreader, the fluid outlet comprising a plurality of apertures; and
   (d) a board forming station for forming the board to pre-set dimensions, the forming station being located downstream of the slurry spreader.

2. The board forming system of claim 1, wherein the slurry spreader is configured such that the fluid flows out of the slurry spreader through the apertures so as to provide a continuous film of fluid across an outer surface of the slurry spreader.

3. The board forming system of claim 1, wherein the apertures are microporous apertures.

4. The board forming system of claim 1, wherein the portion of the slurry spreader comprising the apertures comprises a metal.

5. The board forming system of claim 1, wherein the portion of the slurry spreader comprising the apertures comprises a polymer.

6. The board forming system of claim 1, wherein the portion of the slurry spreader comprising the apertures comprises a ceramic.

7. The board forming system of claim 1, wherein the portion of the slurry spreader comprising the apertures comprises 2 or more compressed screens.

8. The board forming system of claim 1, wherein the slurry spreader is oriented such that its longest dimension is transverse to the direction of the backing layer and slurry as they travel from the mixer discharge to the forming station.

9. The board forming system of claim 1, wherein the length of the slurry spreader is from about 10 inches to about 50 inches.

10. The board forming system of claim 1, wherein the surface of the slurry spreader which contacts the slurry is substantially flat.

11. The board forming system of claim 1, wherein the surface of the slurry spreader which contacts the slurry is curved.

12. The board forming system of claim 1, wherein the slurry spreader has a rectangular, cylindrical, trapezoidal, arched, or ovular cross-sectional shape.

13. The board forming system of claim 12, wherein the slurry spreader is in the shape of a rectangular box.

14. The board forming system of claim 13, wherein three sides of the rectangular box shaped slurry spreader comprise apertures.

15. The board forming system of claim 12, wherein the portion of the slurry spreader comprising the apertures is a stainless steel membrane.

16. The board forming system of claim 15, wherein the membrane has at least about 1,500 holes per square inch.

17. The board forming system of claim 1, wherein the slurry spreader is configured such that at least one surface of the slurry spreader having a plurality of apertures which contacts the slurry is not parallel to the plane of the forming table.

18. The board forming system of claim 17, wherein the angle between the at least one surface of the slurry spreader having a plurality of apertures which contacts the slurry and the forming table is between about 10° and about 90°.

19. The board forming system of claim 1, wherein the cementitious slurry is deposited onto a densified layer carried by a backing layer.

20. The board forming system of claim 1, wherein the forming station comprises a forming plate.

21. The board forming system of claim 20, wherein the distance D is the distance between the area where the slurry exiting the mixer slurry discharge directly or indirectly contacts a backing layer arid the forming plate and the slurry spreader is positioned from about 0.5 D to about 0.9 D in the direction away from the slurry deposited by the discharge of the mixer.

22. The board forming system of claim 1, further comprising one or more slurry vibrators.

23. The board forming system of claim 1, further comprising a blade for cutting the panel into different lengths.

24. The board forming system of claim 1, further comprising a dryer for removing water from the formed board.

25. A gypsum board forming system comprising:
   (a) a mixer for making a cementitious slurry, the mixer comprising a discharge for the slurry;
   (b) a forming table for receiving slurry discharged from the mixer;
   (c) a slurry spreader downstream of the slurry discharge of the mixer and in contact with the cementitious slurry after the slurry is discharged from the mixer, the slurry spreader comprising a fluid inlet and a fluid outlet in communication with the fluid inlet for discharging fluid from the slurry spreader, the fluid outlet comprising a plurality of apertures; and
   (d) a forming plate for forming the board to pre-set dimensions, the forming plate being located downstream of the slurry spreader; and
   (e) a drying region capable of removing water from the formed board.

26. A method of forming a cementitious board material comprising:
   (a) forming a mixture comprising water and a cementitious material;
   (b) transferring the cementitious slurry mixture onto a moving backing layer; and
   (c) contacting at least a portion of the cementitious slurry with a slurry spreader so as to spread the slurry on the backing layer, wherein the slurry spreader comprises a plurality of apertures which are connected to a source of pressurized fluid such that the fluid flows out of the slurry spreader through the apertures.

27. The method of claim 26, wherein the method further comprises:
  (d) contacting the cementitious slurry with a forming plate so as to form a wet cementitious board precursor and
  (e) cutting the wet cementitious board precursor, and optionally
  (f) drying the wet cementitious board precursor to form cementitious board.

28. The method of claim 26, wherein a densified layer is deposited onto the backing layer prior to step (b).

29. The method of claim 26, wherein the cementitious material comprises calcium sulfate material and the cementitious board material formed by the method is a gypsum board product.

30. A method of reducing the water-to-cementitious material ratio during board production comprising:
  (a) forming a mixture comprising water, a foaming agent, and a cementitious material;
  (b) transferring the mixture onto a moving backing layer; and
  (c) contacting at least a portion of the mixture with a slurry spreader so as to spread the mixture along the width of the backing layer, wherein the slurry spreader comprises a fluid inlet and a fluid outlet comprising a plurality of apertures which are connected to a source of pressurized fluid such that the fluid flows out of the slurry spreader through the apertures.

31. The method of claim 30, wherein the method further comprises:
  (d) contacting the mixture with a forming plate so as to form a wet cementitious board precursor;
  (e) cutting the wet cementitious board precursor; and optionally;
  (f) drying the wet cementitious board precursor to form cementitious board.

32. The method of claim 30, wherein a densified layer is deposited onto the backing layer prior to step (b).

33. The method of claim 30, wherein the cementitious material comprises calcium sulfate material and the cementitious board material formed by the method is a gypsum board product.

34. A method of reducing the number of undesirable large voids in cementitious board comprising:
  (a) forming a mixture comprising water, a foaming agent, and a cementitious material;
  (b) transferring the mixture onto a moving backing layer; and
  (c) contacting at least a portion of the mixture with a slurry spreader so as to spread the mixture along the width of the backing layer and eliminate large voids present in the mixture, wherein the slurry spreader comprises a fluid inlet and a fluid outlet comprising a plurality of apertures which are connected to a source of pressurized fluid such that the fluid flows out of the slurry spreader through the apertures.

35. The method of claim 34, further comprising:
  (d) contacting the mixture with a forming plate so as to form a wet cementitious board precursor and
  (e) cutting and drying the wet cementitious board precursor to form a cementitious board product.

36. The method of claim 34, wherein the cementitious material comprises calcium sulfate material and the cementitious board material formed by the method is a gypsum board product.

37. The board forming system of claim 1, comprising more than one slurry spreader.

38. The board forming system of claim 37, wherein the forming station comprises a forming plate and a second slurry spreader is positioned upstream of the forming plate.

39. The board forming system of claim 37, wherein the forming station comprises a forming plate and a second slurry spreader is positioned downstream of the forming plate.

40. The board forming system of claim 1, wherein the slurry spreader further comprises a raised portion having a plurality of apertures which forms an angle $\alpha$ between the surface of the slurry spreader which contacts the slurry and the backing layer.

41. The board forming system of claim 40, wherein the slurry spreader also comprises a portion that is parallel to the plane of the backing layer and comprises a plurality of apertures and contacts the slurry.

42. The board forming system of claim 1, wherein the slurry spreader comprises a portion that is parallel to the plane of the backing layer and comprises a plurality of apertures and contacts the slurry.

43. The board forming system of claim 1, wherein the slurry spreader further comprises a raised edge which can contact the slurry being deposited by the mixer.

44. The board forming system of claim 11, wherein the slurry spreader further comprises a raised edge which can contact the slurry being deposited by the mixer.

45. A slurry spreader for contacting cementitious slurry after the slurry exits a mixer of a board line and before the slurry passes through a forming station, the slurry spreader comprising a fluid inlet and a fluid outlet in communication with the fluid inlet for discharging fluid from the slurry spreader, the fluid outlet comprising a plurality of apertures, wherein the slurry spreader is configured such that fluid flows out of the slurry spreader through the apertures so as to provide a continuous source of fluid across an outer surface of the slurry spreader, which contacts the cementitious slurry.

46. The slurry spreader of claim 45, wherein the slurry spreader has a rectangular, triangular, circular, semi-circular, trapezoidal, ovular, or arched cross-sectional shape.

47. The slurry spreader of claim 45, wherein the slurry spreader is arched and has a curved, convex surface which comprises a plurality of apertures.

48. A slurry spreader for contacting cementitious slurry, the slurry spreader comprising a fluid inlet and a fluid outlet in communication with the fluid inlet for discharging fluid from the slurry spreader, the fluid outlet comprising a plurality of apertures, wherein the slurry spreader is in the shape of a rectangular box and three sides of the rectangular box comprise apertures.

49. A slurry spreader for contacting cementitious slurry, the slurry spreader comprising a fluid inlet and a fluid outlet in communication with the fluid inlet for discharging fluid from the slurry spreader, the fluid outlet comprising a plurality of apertures, wherein the slurry spreader further comprises a raised portion having a plurality of apertures and a parallel portion comprising a plurality of apertures, wherein an angle $\alpha$ is formed between the surface of the raised portion of the slurry spreader which contacts the slurry and the surface of the parallel portion which contacts the slurry.

50. The board forming system of claim 1, wherein the slurry spreader is oriented such that its longest dimension is transverse to the direction of the forming table.

51. The method of claim 26, wherein the flow rate of the fluid through the apertures of the slurry spreader is about 0.6 gallons per minute (gpm) per square foot or less.

52. The method of claim 26, wherein the pressure drop across the portion of the slurry spreader comprising apertures is from about 0.2 psig (pounds-force per square inch gauge) to about 20 psig.

53. The method of claim 26, wherein the fluid comprises water.

54. The method of claim 53, wherein the fluid further comprises additives, which are dissolved in the water.

55. The method of claim 26, wherein the fluid comprises steam vapor.

56. The method of claim 26, wherein the cementitious slurry comprises calcium sulfate material.

57. The method of claim 26, wherein the cementitious slurry comprises Portland cement.

58. The method of claim 26, wherein the cementitious board material is gypsum drywall.

59. The method of claim 26, wherein the cementitious board material is Portland cement board.

60. The method of claim 26, wherein the cementitious board material is an acoustical panel.

* * * * *

UNITED STATES PATENT AND TRADEMARK OFFICE
CERTIFICATE OF CORRECTION

| | | |
|---|---|---|
| PATENT NO. | : 7,364,676 B2 | Page 1 of 1 |
| APPLICATION NO. | : 11/217720 | |
| DATED | : October 2, 2008 | |
| INVENTOR(S) | : Sucech et al. | |

It is certified that error appears in the above-identified patent and that said Letters Patent is hereby corrected as shown below:

On the Title page, please add the following information:

Item --(75) Inventors: Ilya Lerner, Wheeling, IL (US); Michael Chase, Bedford, IN (US); and Bruce L. Petersen, Lisle, IL (US);--.

In Column 10, Line 57: "β-hemihydrate" should read --hemihydrate--.

Signed and Sealed this

Eighteenth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,364,676 B2  
APPLICATION NO. : 11/217720  
DATED : April 29, 2008  
INVENTOR(S) : Sucech et al.

Page 1 of 1

It is certified that error appears in the above-identified patent and that said Letters Patent is hereby corrected as shown below:

On the Title page, please add the following information:

Item --(75) Inventors: Ilya Lerner, Wheeling, IL (US); Michael Chase, Bedford, IN (US); and Bruce L. Petersen, Lisle, IL (US);--.

In Column 10, Line 57: "β-hemihydrate" should read --hemihydrate--.

This certificate supersedes the Certificate of Correction issued November 18, 2008.

Signed and Sealed this

Ninth Day of December, 2008

JON W. DUDAS  
*Director of the United States Patent and Trademark Office*